Aug. 8, 1961     C. L. DANN     2,995,323
DEVICE FOR CONTROLLING THE EFFECTIVE REEFING
AND DEREEFING OF A PARACHUTE CANOPY
Filed Feb. 3, 1960

INVENTOR
CHARLES LESLIE DANN
BY
ATTORNEYS

United States Patent Office 2,995,323
Patented Aug. 8, 1961

2,995,323
DEVICE FOR CONTROLLING THE EFFECTIVE REEFING AND DEREEFING OF A PARACHUTE CANOPY
Charles L. Dann, Letchworth, England, assignor to Irving Air Chute Co., Inc., Lexington, Ky., a corporation of New York
Filed Feb. 3, 1960, Ser. No. 6,483
11 Claims. (Cl. 244—150)

This invention is concerned with improvements in or relating to parachutes and more particularly to those used for braking the speed of aircraft upon landing and/or dropping cargo and other equipment.

When parachutes are used for these purposes there will be a certain maximum permissible speed of landing of the aircraft or cargo and the parachute is required to decelerate the load to that speed. When a parachute first opens the load is subjected to a heavy shock which causes a sudden and rapid deceleration of the load. Thereafter, the rate of deceleration is rapidly reduced and subsequent retardation is relatively low.

In order to reduce the heavy initial shock load to which the equipment is subjected upon opening of a parachute canopy, it has been proposed to provide reefing ties which restrict the size to which the canopy can initially expand and open. Such reefing ties have been associated with cutters actuated by clockwork or barometrically controlled means, which, after a given time or at a given atmospheric pressure, cause a reefing tie to be cut and thus enable the opening of the canopy to be increased. The effect of increasing the opening of the canopy by stages by cutting such reefing ties in succession has been that after each release of a reefing tie there is a high rate of deceleration and corresponding shock load, followed thereafter by a rapidly decreasing rate of decleration until the next tie is released. The reefing ties may be attached at intervals either along the shroud lines or upon the canopy.

The high deceleration and shock to which the parachute and the means by which it is connected to the load have been subjected, have meant that the parachutes and their associated equipment and attachments have had to be of a strength and size capable of resisting such shocks.

It is one object of this invention to provide parachute equipment in which dereefing can be effected in one or more predetermined stages by the use of more compact and lighter devices than those hitherto necessary.

It has been found that variations in tension in the reefing line where the load will always be considerably less than the total drag exerted by the parachute can be utilized to control the dereefing of the canopy. It will be appreciated that when a reefed parachute is decelerating a load the tension in the reefing line will decrease as a function of decrease in the speed of the load, so that for any particular speed of descent of the load, there will be a corresponding tension in the reefing line.

According to the invention therefore, the parachute canopy is provided with a reefing line which serves to control the size to which the canopy is permitted to open during descent and means operatively associated with said reefing line and responsive to the tension in said line which serve when the tension reaches a predetermined value to free the reefing line to permit further deployment of the canopy.

It is also within the scope of this invention to provide a parachute canopy having at least one reefing line extending around its lower periphery and serving to control the flying diameter thereof at a predetermined size; means responsive to the tension in said reefing line being interposed between the ends of the line which serve upon the tension reaching a predetermined value to free the reefing line and permit an increase in the diameter of the canopy.

In general, it is preferred to dereef the parachute canopy in one single stage by providing a single reefing line which when released permits the canopy to open to its maximum flying diameter. If desired, however, two or more reefing lines, each operative associated with means responsive to the tension in the respective line to permit further opening of the canopy may be provided so that in such case the flying diameter of the canopy would be increased in a predetermined number of stages dependent on the speed of descent of the load.

Although it is possible to arrange for the reefing line to extend around or embrace the shroud lines so as to control the deployment of the canopy, it is generally preferred to arrange for the reefing line to extend around the periphery of the skirt of the canopy in rings or loops provided thereon.

While it is preferred to mount the said reefing line restraining means on the canopy, it will be understood that such means can be mounted on the shroud lines or indeed on the load itself, the reefing line being in such cases extended in length to bring it into operative association with said means.

In order that the invention may be well understood, two embodiments will now be described in more detail with reference to the accompanying drawings in which.

Figure 1:
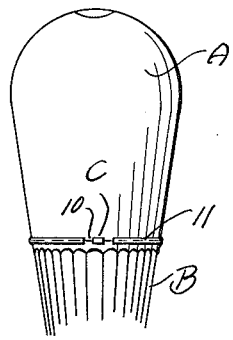
FIGURE 1 is a diagrammatic view of a partly inflated parachute canopy according to the invention, in reefed condition.
Figure 2:
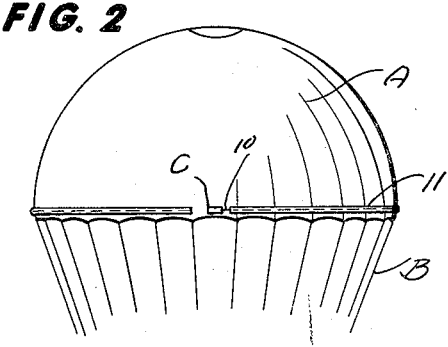
FIGURE 2 shows the same parachute canopy in a dereefed condition.

Referring to FIGURES 1 and 2, a parachute canopy A has shroud lines B which may be connected in any suitable manner to cargo to be dropped or to an aircraft wherein parachute braking is required. A reefing line 10 is slidably arranged in flexible loops or tubes 11 attached around the periphery of the skirt of the canopy; the ends of line 10 being connected to a device C which retains the reefing line and canopy in reefed condition (FIGURE 1) until, due to the tension in the line falling to a predetermined value, it releases the line to permit the canopy to expand to its full flying diameter (FIGURE 2).

Figure 3:
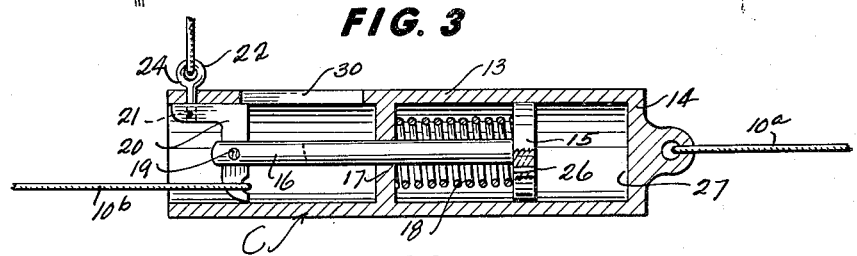
FIGURE 3 is a longitudinal sectional view of one form of restraining means responsive to tension in the reefing line, in reefed position.
Figure 4:
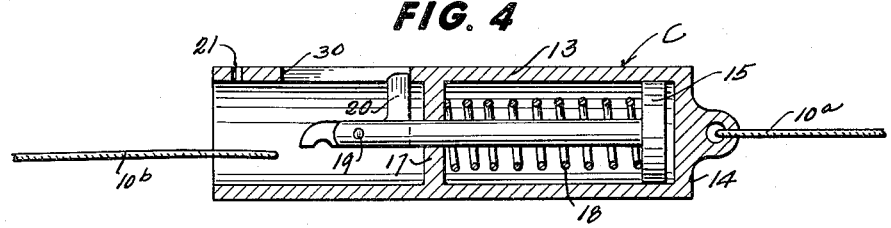
FIGURE 4 shows the same means as shown in FIGURE 3, in the dereefed position.

Referring to FIGURES 3 and 4, the device C comprises a cylinder 13, to a closed end 14 of which one end of the reefing line 10$^a$ is permanently secured. A piston 15 having a piston rod 16 is slidably disposed in cylinder 13; the piston rod 16 passing through a partition wall 17 secured to the cylinder 13. A spiral spring 18 is mounted in the cylinder chamber around the piston rod 16; its ends abutting respectively on partition 17 and piston 15; the spring being compressed and tending always to urge the piston 15 in a direction away from the wall 17.

On a bifurcated end of piston rod 16 remote from piston 15 there is pivoted at 19 an L-shaped latching member 20 having a hook at one end which releasably engages the looped other end 10$^b$ of the reefing line 10. The laterally extended end of latch member 21, opposite the pivot 19 from the hooked end is adapted to lie against the inside wall of cylinder 13 and has an aperture 21 which serves to receive a locking pin 22 which passes through an aperture 24 in the wall of the cylinder to hold the latching device in an inoperative position when the parachute is not in use.

Pin 24 will, in use, be connected to a shroud line of the canopy so that upon initial deployment of the canopy the pin 24 is withdrawn to arm the device for operation. It is preferred to provide one or more bleed or damping vents such as 26 in piston 15 so that air in the cylinder space 27 can only escape very slowly thus preventing any sudden movements of the piston in the cylinder during momentary relaxations in the tension of reefing line 10 as may occur during initial deployment of the canopy. If desired, a heavier damping may be achieved by filling the cylinder space on both sides of piston 15 with a liquid.

Upon initial deployment of the canopy to its reefed position (FIGURE 1) the tension in the reefing line will be greater than the normal unstressed condition of springs 18 and hence after withdrawal of pin 24 the hook end of latch 20 will remain in the position shown in FIGURE 3 with the end 10$^b$ of the reefing line 10 held thereon. When due to the deceleration of the load, the tension in line 10 drops to a value less than the stress of spring 18, the piston 15 will be urged into cylinder 13 drawing latch member 20 therewith until the latter reaches a slot 30 in the wall of the cylinder 13 and is freed to pivot into its unlatching position (FIGURE 4) thus releasing looped end 10$^b$ of line 10 to permit the canopy to expand to its full flying diameter (FIGURE 2).

Figure 5:
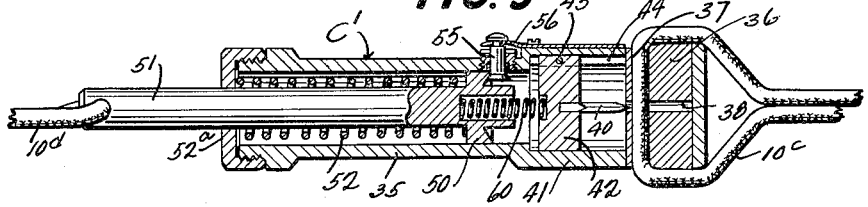
FIGURE 5 shows a longitudinal sectional view of another form of reefing line restraining means responsive to tension in the reefing line in the reefed position.
Figure 6:
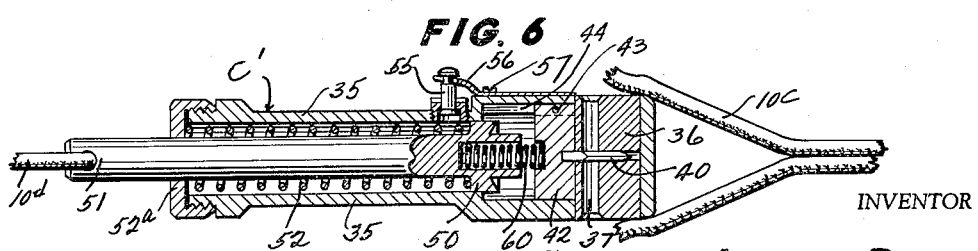
FIGURE 6 shows the means of FIGURE 5 in line dereefing position.

In FIGURES 5 and 6, another reefing control C' is shown. It comprises a cylindrical body 35 closed at one end by a wall 36 having a transverse hole 37 therethrough for receiving a looped end 10$^c$ of the reefing line. Wall 36 is secured to body 35 and has a slot 38 therein to receive a knife blade 40 as will be described.

An enlarged portion 41 of body 35 has a slidable disc 42 which is keyed against rotation in a way 44 of the cylinder part 41. Disc 42 carries the knife blade 40 in extended relation therefrom; a shear pin or wire 43 serving to retain disc 42 with the cutting edge of blade 40 adjacent but out of contact with the strand of loop 10$^c$ extending through the passage 37, until the device is operated.

Body 35 also has a piston 50 therein, the piston rod 51 of which extends through the other end of the body and has the other end 10$^d$ of a reefing line connected thereto. A threaded cap 52$^a$ serves to close this end of body 10. A strong compression spring 52 is interposed between end cap 52$^a$ and piston 50 and tends always to urge piston 50 towards disc 42.

A detent member 55 having a flanged end is mounted so as to be movable radially into and out of the wall of body 35. Detent member 55 is movably carried by a leaf spring 56 secured at 57 to the cylinder portion 41. This spring tends always to urge detent member 55 outwardly of body 35. Piston 50 however is so shaped on its front face as to engage with the flanged end of detent member 55 so that under the load of compressed spring 52 the detent member 55 prevents movement of the piston 50 towards the wall 36 until further compression of spring 52 permits leaf spring 56 to withdraw detent member 55 from the path of piston 50.

A lighter compression spring 60 is interposed between piston 51 and disc 42 to boost the line cutting action.

As shown in FIGURE 5, the control C' is in an armed condition ready to operate to dereef a parachute canopy at a predetermined speed, which speed will determine the extent of compression of spring 21.

When the parachute canopy opens, a high tension is created between the ends 10$^c$ and 10$^d$ of the refing cord. This tension further compresses the compressed main spring 52 and removes the load from the detent member 55, which is thereupon withdrawn by leaf spring 56 out of the path of piston 50 (see FIGURE 6).

As the reefed parachute canopy decelerates its load, tension is reduced and the main spring 52 expands. This action compresses the spring 60 and moves it toward wall 36 until such time as the pressure on the disc 42 is sufficient to shear the pin 43. Under the action of the spring 60, the block disc 42 and knife 40 fly forwards and cut the looped end 10$^c$ of the reefing cord, thus allowing the canopy to become fully deployed.

If desired, spring 60 shown in FIGURES 5 and 6 may be omitted although in such case, the knife 40 will tend to cut the reefing loop 10$^c$ only gradually as spring 52 expands and not positively and sharply as is the case in the embodiment shown in FIGURES 5 and 6. It is also possible if desired to incorporate a dash pot device for controlling inadvertent movements of piston 50 upon initial deployment of the canopy, such device being similar to that provided in the embodiment of FIGURES 3 and 4.

Various modifications and variations can be made in the embodiments above described, without departing from the spirit of the invention or the scope of the claims.

I claim:

1. In a device for controlling the effective reefing of a parachute canopy under deployment, the combination of a canopy reefing cord, a casing having a chamber, means on the casing for fixed attachment of one end of the reefing cord, cord tensioning means mounted in the casing, and a detent member upon the casing for the tensioning means having means thereon for connection of the opposite end of the reefing cord thereto in order to hold the tensioning means in cord tensioning condition.

2. In combination with a reefing line adapted for use in connection with parachutes to control the degree of opening thereof, the combination of a casing having means thereon for attachment of one end of a reefing line thereto, line tensioning means mounted upon the casing, detent means mounted upon the casing for holding the tensioning means in line tensioning condition, and means for connecting the other end of the reefing line to said tensioning means whereby upon release of the detent means the tensioning means as the parachute decelerates during descent will act to release the reefing line for unreefing the parachute.

3. As an article of manufacture, a device to enable dereefing of a parachute canopy after initial inflation comprising a casing having means thereon for attaching an end of a reefing line thereto, said casing having a chamber therein, a piston and piston rod assembly slidable in the chamber of the casing, a compressed spring in the casing normally urging the piston in one direction in said chamber, detent means associated with the casing for normally holding the spring in compressed relation and having means thereon for attachment of the other end of the reefing line thereto.

4. As an article of manufacture, a reefing line for the reefing of parachute canopies to retard inflation thereof having interposed therein a line tensioning means, a detent for holding the tensioning means inoperative, and means to trip the detent as an incident of tensioning of the line to a degree greater than the normal tension imposed upon the line.

5. A device for use in releasing a parachute canopy reefing tie comprising a casing having a chamber therein and means on the casing for connecting one end of a reefing tie thereto, a piston and piston rod assembly slidable in said chamber, latching means mounted upon the piston rod having means thereon for releasable connection of the other end of the reefing tie thereto, a compression spring mounted in the chamber normally biasing the piston into the chamber away from said latching means, a restraining member mounted on the casing for normally holding the latching means in inoperative position with the spring compressed, said casing being shaped to trip the latch and enable the spring to expand and the latch connected end of the reefing tie to be released when the tensioning of the reefing tie relaxes incident to deceleration of the canopy under load descent after load shock inflation of the canopy.

6. A reefing tie control device for parachutes comprising a casing having a chamber therein, a piston slidable in the chamber, a piston rod connected to the piston, a compressed spring in the casing chamber normally urging the piston in one direction in said chamber, an L-shaped latch member pivoted to the piston rod remote from the piston, releasable detent means connected to the casing for holding the L-shaped latch in inoperative position with the spring compressed, said casing at the piston end having means thereon for attachment of one end of the reefing tie thereto and said latch at the opposite side of its pivot on the piston rod with respect to said detent means having means for releasable connecting the other end of the reefing tie thereto.

7. A device as described in claim 6 in which damping means is in said chamber acting upon said piston to permit gradual expansion of the spring when the latching means is tripped.

8. In a controlling device for parachute canopy reefing ties, the combination of a casing having a chamber therein, a piston slidable in said chamber, a piston rod connected to the piston having means thereon for connection of an end of a reefing tie thereto, a movable detent carried by said casing, spring means on the casing normally urging the detent out of the path of the piston, a compression spring in the casing normally urging the piston against said detent, the detent and piston being so constructed and arranged that normal compression of said last mentioned spring will hold said detent in piston restraining position against normal action of the detent release spring first mentioned, means for connecting the other end of the reefing tie to the casing remote from the connection of the first mentioned end of the tie to said piston rod, and movable knife means carried by the casing under control of said piston for severing the last mentioned end of the reefing tie when the detent is removed as an incident of further compression of said piston spring caused by tension upon the reefing tie as an incident of shock opening of the canopy whereby to sever said second mentioned end of the reefing tie as the parachute canopy speed decelerates and tension in the reefing tie is reduced.

9. A reefing tie control device as described in claim 8 in which a slidable disc is mounted in the chamber of said casing between the piston and the second mentioned end of the reefing tie, said slidable disc having the aforesaid knife mounted thereon, and a second compression spring interposed between the piston and the slidable disc normally urging the slidable disc and its knife in severing direction with respect to the second mentioned end of the reefing tie.

10. In combination with a reefing line adapted for use in connection with parachute canopies to control the degree of opening thereof, the combination of a casing having means thereon for attaching one end of the reefing line thereto, a piston and rod mechanism slidable in the casing, a spring normally under compression mounted in the casing normally urging the piston toward the casing attached end of said reefing line, a latch member pivotally mounted upon the piston rod within said casing having an end thereof shaped for releasable connection with the other end of the reefing line, said latch at the opposite side of the pivot from its connection with the reefing line having a portion normally engaging the inner walls of the casing when the spring is under normal compression to hold the latch in such position whereby to prevent release of the latch attached end of the reefing line, releasable detent means normally holding the latch in said last mentioned position, said casing being recessed so that as the detent means is released from the latch the spring will expand to move the latch along the casing and into position to dispose the wall engaged portion of the latch in said recess and enable the latch to turn on its pivot under the force of the spring whereby to release the latch attached end of the reefing line.

11. A device to control dereefing of parachute canopies comprising a reefing line adapted to be used upon a parachute to restrict the normal initial opening thereof, a casing having a chamber therein and provided with means thereon for connection of one end of the reefing line thereto, a piston slidable in said chamber, a spring in the casing, means on the casing engaging the spring at one end and the piston at the other end and normally urging said piston along the casing chamber, a piston rod connected to the piston, a latch means movably mounted upon said piston rod having means thereon to releasably hold the other end of the reefing line, said latch means having releasable connection with the casing to hold the spring normally under compression, said casing and latch means being so constructed and arranged as to cause the latch means to unlatch and release the said other end of the reefing line therefrom when due to acceleration of a load attached to the parachute the tension in the reefing line drops to a value less than the stress of the compressed spring.

References Cited in the file of this patent

UNITED STATES PATENTS

| | | |
|---|---|---|
| 2,675,198 | Reihman | Apr. 13, 1954 |
| 2,732,153 | Frieder et al. | Jan. 24, 1956 |
| 2,755,550 | Benjamin | July 24, 1956 |
| 2,929,589 | Carter et al. | Mar. 22, 1960 |

FOREIGN PATENTS

| | | |
|---|---|---|
| 338,072 | Italy | Mar. 28, 1936 |
| 748,009 | Great Britain | Apr. 16, 1956 |
| 776,296 | Great Britain | June 5, 1957 |
| 817,156 | Great Britain | July 22, 1959 |